(12) United States Patent
Ichikawa et al.

(10) Patent No.: US 10,889,381 B2
(45) Date of Patent: Jan. 12, 2021

(54) ANTI-ICING SYSTEM AND AIRCRAFT

(71) Applicant: MITSUBISHI AIRCRAFT CORPORATION, Aichi (JP)

(72) Inventors: Gento Ichikawa, Tokyo (JP); Yoichi Uefuji, Tokyo (JP); Toshiyuki Ishida, Tokyo (JP); Masatoshi Morishita, Tokyo (JP); Kazuhiro Kawai, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 290 days.

(21) Appl. No.: 15/420,465

(22) Filed: Jan. 31, 2017

(65) Prior Publication Data
US 2017/0233084 A1 Aug. 17, 2017

(30) Foreign Application Priority Data

Feb. 12, 2016 (JP) .................................. 2016-024387

(51) Int. Cl.
*B64D 15/04* (2006.01)
(52) U.S. Cl.
CPC .................................. *B64D 15/04* (2013.01)
(58) Field of Classification Search
CPC .......... B64D 15/02; B64D 15/04; F02C 7/047
See application file for complete search history.

(56) References Cited

U.S. PATENT DOCUMENTS

| | | | | |
|---|---|---|---|---|
| 2,081,963 A * | 6/1937 | Theodorsen | ........... | B64D 15/04 244/134 B |
| 2,097,926 A * | 11/1937 | Kimball | ................. | B64D 15/16 106/13 |
| 2,187,506 A * | 1/1940 | Daam | .................... | B64D 15/04 244/134 B |
| 2,374,441 A * | 4/1945 | Loufek | .................. | B64D 15/02 237/12.3 A |

(Continued)

FOREIGN PATENT DOCUMENTS

| CN | 203996904 U | 6/2014 |
|---|---|---|
| DE | 1213256 B | 3/1966 |

(Continued)

OTHER PUBLICATIONS

Extended European Search Report for EP 17154201.2 dated Jul. 11, 2017.

(Continued)

*Primary Examiner* — Philip J Bonzell
(74) *Attorney, Agent, or Firm* — Pearne & Gordon LLP

(57) ABSTRACT

An anti-icing system according to the present invention blows heated air to a curved inner surface of a main wing of an aircraft. The anti-icing system includes: a piccolo tube that includes a flow path through which the heated air flows in a longitudinal direction from a rear end to a front end, and a plurality of ejection holes provided along the longitudinal direction to make the flow path communicate with an outside; and an engine that supplies the heated air toward the piccolo tube. The heated air ejected from the ejection holes (Continued)

of the piccolo tube is ejected toward an upper limit position and a lower limit position of an outside airflow stagnation point that are virtually formed on the main wing.

12 Claims, 6 Drawing Sheets

(56) References Cited

U.S. PATENT DOCUMENTS

| | | | | |
|---|---|---|---|---|
| 2,447,095 A * | 8/1948 | Schmidt | ............... | B64D 15/02 244/134 B |
| 2,514,105 A * | 7/1950 | Thomas | ............... | B64D 15/02 165/134.1 |
| 3,917,193 A * | 11/1975 | Runnels, Jr. | ............... | B64C 9/24 244/134 B |
| 4,741,499 A * | 5/1988 | Rudolph | ............... | B64D 15/04 244/134 B |
| 4,976,397 A * | 12/1990 | Rudolph | ............... | B64D 15/04 244/134 B |
| 5,011,098 A * | 4/1991 | McLaren | ............... | B64D 15/04 244/134 B |
| 5,218,863 A * | 6/1993 | Mangalam | ............... | G01M 9/065 244/203 |
| 5,807,454 A * | 9/1998 | Kawabe | ............... | B29C 70/443 156/214 |
| 5,865,400 A * | 2/1999 | Pike | ............... | B64D 15/04 239/587.1 |
| 5,873,544 A * | 2/1999 | Pike | ............... | B64D 15/04 174/51 |
| 6,003,814 A * | 12/1999 | Pike | ............... | B64D 15/04 239/587.1 |
| 6,119,978 A * | 9/2000 | Kobayashi | ............... | B21D 26/055 244/134 R |
| 6,279,228 B1 * | 8/2001 | Kobayashi | ............... | B21D 26/055 228/190 |
| 6,467,730 B2 * | 10/2002 | Laugt | ............... | B64D 15/04 244/123.14 |
| 8,100,364 B2 * | 1/2012 | Nieman | ............... | B64D 15/04 244/134 B |
| 8,579,236 B2 * | 11/2013 | Wollaston | ............... | B64D 15/04 244/134 B |
| 9,815,558 B2 * | 11/2017 | Saeed | ............... | B64D 15/04 |
| 10,035,578 B2 * | 7/2018 | Nordin | ............... | B64C 23/00 |
| 2009/0090814 A1 | 4/2009 | Barbara et al. | | |
| 2010/0176243 A1 * | 7/2010 | Nieman | ............... | B64D 15/04 244/134 B |
| 2012/0187254 A1 * | 7/2012 | Wollaston | ............... | B64C 9/22 244/214 |
| 2012/0291875 A1 | 11/2012 | Shah et al. | | |
| 2012/0318922 A1 | 12/2012 | Saito et al. | | |
| 2014/0070054 A1 * | 3/2014 | Burton | ............... | H01L 51/0048 244/134 D |
| 2015/0298791 A1 * | 10/2015 | Nordin | ............... | B64D 15/12 244/45 R |
| 2015/0346122 A1 * | 12/2015 | Stothers | ............... | B64D 15/14 702/130 |
| 2016/0122006 A1 * | 5/2016 | Taylor | ............... | B64C 21/10 244/200.1 |
| 2016/0221680 A1 * | 8/2016 | Burton | ............... | H05B 3/34 |
| 2017/0166313 A1 * | 6/2017 | Saeed | ............... | B64D 15/04 |

FOREIGN PATENT DOCUMENTS

| | | |
|---|---|---|
| EP | 2481672 A2 | 8/2012 |
| GB | 486549 A | 6/1938 |
| JP | 2009-523637 A | 6/2009 |
| JP | 2011-183922 A | 9/2011 |
| JP | 2012-241732 A | 12/2012 |
| JP | 2013-163478 A | 8/2013 |

OTHER PUBLICATIONS

Office action and English translation for Japanese application No. 2016-024387 dated Dec. 3, 2019.

* cited by examiner

FIG. 2A
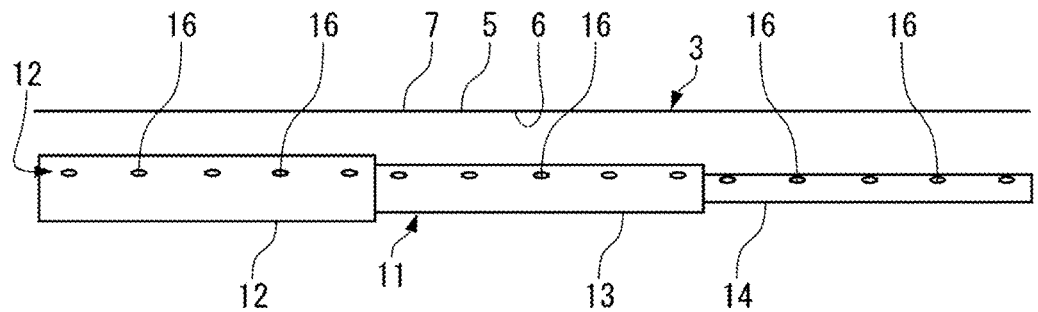
FIG. 2B
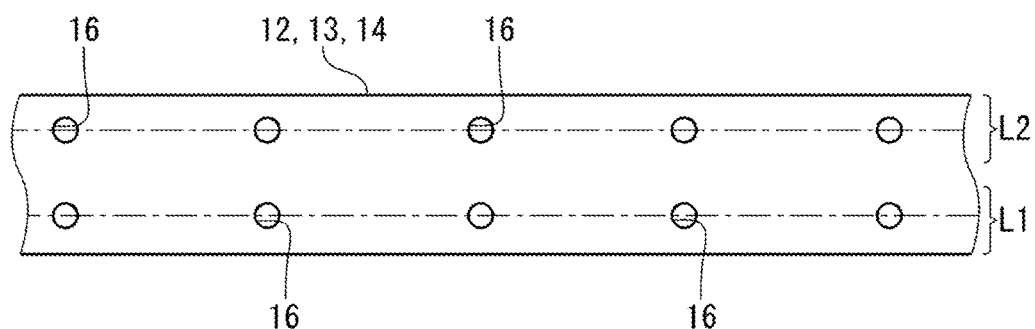
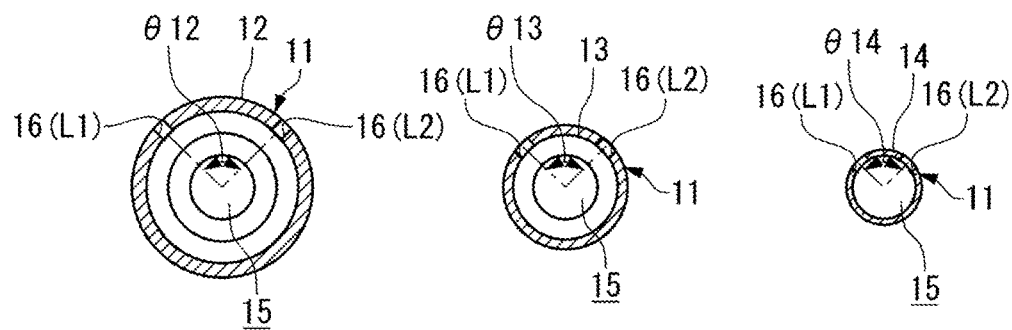
FIG. 2C  FIG. 2D  FIG. 2E

ANTI-ICING SYSTEM AND AIRCRAFT

BACKGROUND OF THE INVENTION

Field of the Invention

The present invention relates to an anti-icing system that prevents icing on a leading edge of an aircraft, and to an aircraft including the anti-icing system.

Description of the Related Art

During flight of an aircraft, icing occurs on an outer surface of a leading edge in a traveling direction of the aircraft, such as a main wing, a tail wing, and an air intake, due to collision of supercooled droplets in the air. The icing phenomenon variously adversely affects flight of the aircraft. Therefore, an anti-icing system that prevents icing by various heating means are provided at positions that may be particularly affected by the icing phenomenon.

In an aircraft including a turbine engine, as one of the anti-icing systems, bleed air that is high-temperature high-pressure air extracted from an engine compressor has been widely used as a heating source. In such an anti-icing system, the bleed air is guided through a pipe, cooled to a predetermined temperature, and is blown to the inner surface of the leading edge, thereby performing heating. A member called piccolo tube that has, in the longitudinal direction, a plurality of ejection holes through which the bleed air is ejected is used as the pipe. For example, when being provided in the main wing, the piccolo tube is disposed near the leading edge along a wing length direction from an end connected to a fuselage toward a front end. As illustrated in FIG. 6B, the method makes it possible to provide high heat transfer coefficient at a blown point of the bleed air. This makes it possible to reduce an air supply amount and to suppress deterioration of fuel consumption, as compared with other methods.

In FIG. 6B, a dashed line indicates distribution of the heat transfer coefficient of the bleed air (HD), and a solid line indicates distribution of a collision amount of droplets (DD). FIG. 6B illustrates that the blown point at which the heat transfer coefficient by the bleed air reaches a peak and an outside airflow stagnation point (hereinafter, simply referred to as a stagnation point) Ps at which the collision amount of the droplets reaches a peak are coincident with each other.

As illustrated in FIG. 6B, the heat transfer coefficient is drastically decreased at positions away from the blown point at which the heat transfer coefficient reaches a peak. Therefore, temperature unevenness easily occurs at the blown point and positions away from the blown point. If the positions of the respective ejection holes of the piccolo tube are not appropriate, disadvantageously, heating may become insufficient or damage of the leading edge structure caused by overheating may be accelerated. Therefore, a method of focusing on particularly stringent icing flight condition and orienting the ejection holes to concentrate a heating amount to the stagnation point at which the collision amount of the droplets reaches a peak under the condition is typically used. When the flight condition, in particular, an angle of attack of the aircraft is varied and the position of the stagnation point is accordingly moved, however, the blown point, namely, a point to which the heating amount is concentrated is not coincident with the position at which the collision amount of the droplets reaches a peak as illustrated in FIG. 6C, which deteriorates efficiency of heating. This may cause increase of the air amount necessary for anti-icing or may accelerate damage of the leading edge structure caused by overheating.

Note that the vertical direction in FIGS. 6B and 6C indicates a horizontal direction of environment in which the aircraft flies. In addition, in FIGS. 6B and 6C, P1 indicates an upper limit position of the collision of the droplets, and P2 indicates a lower limit position of the collision of the droplets.

Therefore, Japanese Patent Laid-Open No. 2011-183922 suggests a method of configuring the inner surface side of the leading edge structure of the main wing as the double structure and averaging heat transfer coefficients. In addition, National Publication of International Patent Application No. 2009-523637 suggests means that promotes cooling by making a transition from a flow on an outer surface of the leading edge structure to turbulent flow, thereby preventing local overheating.

The suggestion by Japanese Patent Laid-Open No. 2011-183922, however, uses the double structure that is complicated. In addition, since the double structure causes increase of the weight and heat loss to the parts other than the part to be heated is large, it is necessary to increase the amount of extracted air, which may result in deterioration of fuel consumption.

Moreover, the suggestion by National Publication of International Patent Application No. 2009-523637 uses the structure that makes transition to the turbulent flow. The structure may increase, for example, air resistance of a main wing and accordingly cause deterioration of fuel consumption. In addition, since the cooling of the leading edge is promoted, the necessary amount of the heated air may be increased.

Therefore, an object of the present invention is to provide an anti-icing system that has a simple and light configuration and makes it possible to exert anti-icing performance by dealing with displacement of a stagnation point without increasing air resistance.

SUMMARY OF THE INVENTION

An anti-icing system according to the present invention blows heated air to a curved inner surface of a wing of an aircraft. The anti-icing system includes: a piccolo tube that includes a flow path through which the heated air flows in a longitudinal direction from a rear end to a front end, and a plurality of ejection holes provided along the longitudinal direction to make the flow path communicate with an outside; and a supply source that supplies the heated air toward the piccolo tube. The heated air ejected from the ejection holes of the piccolo tube is ejected toward an upper limit position and a lower limit position of an outside airflow stagnation point that are virtually formed on the wing.

In the piccolo tube according to the present invention, the plurality of ejection holes may be preferably straightly arranged in a first ejection hole line L1 and a second ejection hole line L2. The first ejection hole line L1 may be preferably disposed on relatively upper side, and the second ejection hole line L2 may be preferably disposed on lower side of the first ejection hole line L1. The heated air ejected from the first ejection hole line L1 may be preferably ejected toward the upper limit position, and the heated air ejected from the second ejection hole line L2 may be preferably ejected toward the lower limit position.

In the anti-icing system according to the present invention, the outside airflow stagnation point under a condition that a collision amount of droplets becomes highest may be preferably disposed in a middle between an upper limit stagnation point and a lower limit stagnation point.

In the anti-icing system according to the present invention, the plurality of ejection holes are disposed such that the outside airflow stagnation point under a condition that a collision amount of droplets becomes highest is located in a middle between positions at which heat transfer coefficient by the heated air ejected from the first ejection hole line L1 and the second ejection hole line L2 reaches respective peaks.

In the piccolo tube according to the present invention, the plurality of ejection holes forming the first ejection hole line L1 and the plurality of ejection holes forming the second ejection hole line L2 may be preferably arranged in a staggered arrangement.

In the piccolo tube according to the present invention, the plurality of ejection holes forming the first ejection hole line L1 and the plurality of ejection holes forming the second ejection hole line L2 may be preferably arranged in the same phase in a circumferential direction of the piccolo tube.

The piccolo tube according to the present invention may preferably have a tapered shape from a rear end side to a front end side, and the first ejection hole line L1 and the second ejection hole line L2 may preferably form, on the front end side, a center angle $\theta c$ smaller than a center angle $\theta a$ that is formed by the first ejection hole line L1 and the second ejection hole line L2 on the rear end side.

In the piccolo tube according to the present invention, each of the ejection holes may be preferably formed of a slit that vertically extends from an upper end opening part to a lower end opening part, the heated air ejected from the upper end opening part may be preferably ejected toward the upper limit position, and the heated air ejected from the lower end opening part may be preferably ejected toward the lower limit position.

An aircraft according to the present invention includes the anti-icing system described above.

In the aircraft according to the present invention, the anti-icing system may be preferably provided in a main wing.

The anti-icing system according to the present invention ejects the bleed air toward the upper limit position and the lower limit position of the outside airflow stagnation point. Therefore, even if the stagnation point reaches the upper limit position due to change of the attitude of the aircraft, the stagnation point is coincident with or near one of the positions at which the heat transfer coefficient reaches a peak. Likewise, even if the stagnation point reaches the lower limit position due to change of the attitude of the aircraft, the stagnation position is coincident with or near the other of the positions at which the heat transfer coefficient reaches a peak. This allows for efficient evaporation of moisture in a region where the heat transfer coefficient is high, near the blown point, which makes it possible to reduce the amount of the bleed air necessary for anti-icing and overheating is prevented.

Further, when the position at which the collision amount of the droplets becomes the highest is located in the middle between the two positions at which the heat transfer coefficient reaches respective peaks, the most amount of the droplets collide with a region where the heating amount is small, and the droplets are not wholly evaporated. Therefore, the residual moisture forms a water film on the surface of the leading edge. The water film moves downward to reach the positions at which the heat transfer coefficient reaches the respective peaks. Consequently, the water film is evaporated and prevents overheating.

BRIEF DESCRIPTION OF THE DRAWINGS

FIG. 1A is a plan view of the anti-icing system including a main wing of an aircraft, and FIG. 1B is a cross-sectional diagram of the main wing;

FIGS. 2A to 2E are diagrams each illustrating a piccolo tube of FIGS. 1A and 1B, where FIG. 2A is a plan view, FIG. 2B is a partial front view, FIG. 2C is a cross-sectional diagram illustrating an upstream tube, FIG. 2D is a cross-sectional diagram illustrating a middle-stream tube, and FIG. 2E is a cross-sectional diagram illustrating a downstream tube;

FIG. 3A is a diagram illustrating the relationship when a stagnation point is located lower than an upper limit position by a predetermined amount, FIG. 3B is a diagram illustrating the relationship when the stagnation point is located at a middle point, and FIG. 3C is a diagram illustrating the relationship when the stagnation point is located higher than a lower limit position by a predetermined amount;

FIG. 5A is a front view of a piccolo tube in which ejection holes are arranged in a staggered arrangement, FIG. 5B is a front view of a piccolo tube in which ejection holes are arranged in three lines, FIG. 5C is a front view of a piccolo tube in which ejection holes are each formed in a slit shape, and FIG. 5D is a diagram illustrating an example in which two piccolo tubes each having ejection holes arranged in one line are arranged.

DETAILED DESCRIPTION OF THE PREFERRED EMBODIMENTS

An embodiment of an anti-icing system according to the present invention is described below with reference to accompanying drawings.

Figure 1A:
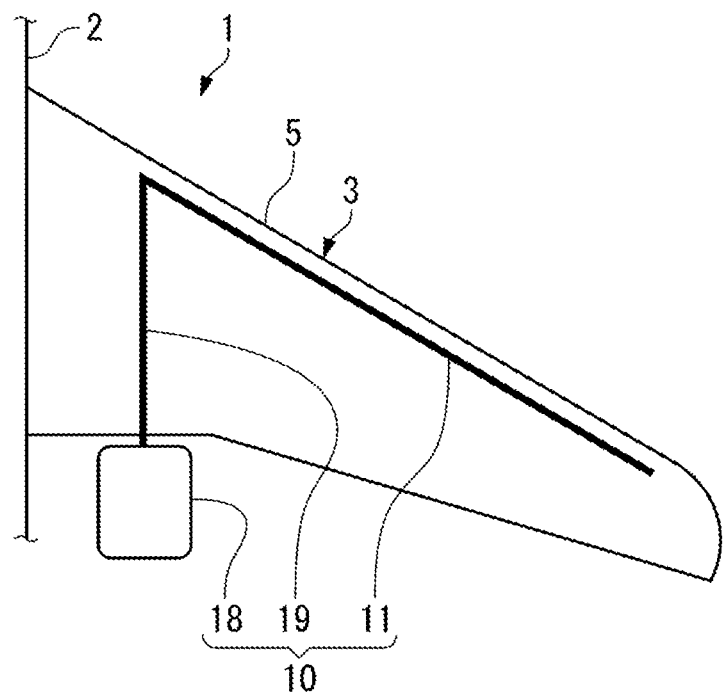
FIGS. 1A and 1B are diagrams each illustrating a schematic configuration of an anti-icing system according to an embodiment of the present invention, where
Figure 1B:
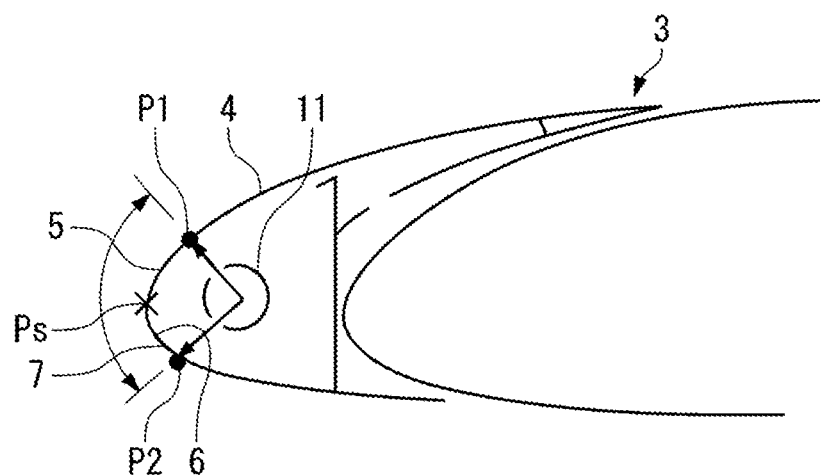

As illustrated in FIGS. 1A and 1B, an anti-icing system 10 according to the present embodiment is provided inside a slat 3 of a main wing 1 of an aircraft, thereby preventing icing on an outer surface 7 of a leading edge 5 of the slat 3.

The slat 3 has an outer hull configured of a wing panel 4. The wing panel 4 may be made of, for example, an aluminum alloy, or a fiber reinforced resin such as carbon fiber reinforced plastics (CFRP) and glass fiber reinforced plastics (GFRP). As illustrated in FIG. 1B, a cross-sectional surface of the leading edge 5 along a wing length direction of the wing panel 4 has a curved shape derived from bending process. The anti-icing system 10 ejects bleed air that is heated air, toward an inner surface 6 of the leading edge 5, thereby preventing icing on the outer surface 7.

As illustrated in FIG. 1A, the anti-icing system 10 includes: a piccolo tube 11 that ejects the bleed air to the leading edge 5; an engine 18 that is a supply source of the bleed air; and an air supply tube 19 that connects the piccolo tube 11 with the engine 18 and guides the bleed air to the piccolo tube 11. The engine 18 is to obtain thrust force of the aircraft, and may be, for example, a jet engine mounted to a bottom surface of the main wing 1. The bleed air is the air extracted from a compressor of the jet engine, and has appropriate temperature because of previous cooling.

As illustrated in FIGS. 1A and 1B, the piccolo tube 11 is disposed, along the wing length direction of the main wing 1, at a position separated from the inner surface 6 of the leading edge 5 by a predetermined distance.

As illustrated in FIG. 2A, the piccolo tube 11 has a tapered shape configured of three parts, namely, an upstream tube 12, a middle-stream tube 13, and a downstream tube 14 that are disposed in order from a rear end, as upstream side, continuous with the air supply tube 19 toward a front end. Note that upstream, middle-stream, and downstream are expression used for discriminating the three parts from one another, and merely express relative relation of the three parts.

As illustrated in FIGS. 2C to 2E, the upstream tube 12, the middle-stream tube 13, and the downstream tube 14 are each configured of a hollow cylindrical tubular member, and the respective hollow parts thereof configure a flow path 15 through which the bleed air flows.

As illustrated in FIGS. 2C to 2E, the upstream tube 12, the middle-stream tube 13, and the downstream tube 14 have different inner diameters from one another. This causes respective opening areas $A12$, $A13$, and $A14$ of the flow path 15 in the upstream tube 12, the middle-stream tube 13, and the downstream tube 14 to be decreased in a stepwise manner along a flowing direction of the bleed air. The piccolo tube 11 is configured by connecting, through welding or other process, the upstream tube 12, the middle-stream tube 13, and the downstream tube 14 that are prepared as separate tubes.

$A1 > A1 > A1$

A plurality of ejection holes 16 that open to face the inner surface 6 of the leading edge 5 are provided in the piccolo tube 11. The ejection holes 16 make the flow path 15 communicate with the outside. As illustrated in FIGS. 2A and 2B, the plurality of ejection holes 16 are provided side by side with predetermined intervals in the longitudinal direction of the piccolo tube 11. The bleed air that has flowed into the piccolo tube 11 from the air supply tube 19 is ejected as high-temperature high-speed jet flow from the ejection holes 16 toward the inner surface 6 of the leading edge 5.

As illustrated in FIGS. 2A and 2B, in the piccolo tube 11 according to the present embodiment, the plurality of ejection holes 16 are arranged in two straight lines in the longitudinal direction. The two lines are disposed on the piccolo tube 11 in a circumferential direction thereof. Arranging the ejection holes 16 in the two lines makes it possible to cause the bleed air to be blown to a wide range of the inner surface, and to reduce a flow rate of the bleed air ejected from one ejection hole 16. This prevents heat transfer coefficient from becoming excessively large and prevents overheating of the members. Note that, as illustrated in FIG. 2B, the lines formed of the plurality of ejection holes 16 are respectively referred to as a first ejection hole line L1 and a second ejection hole line L2. Note that the ejection holes 16 are disposed in the same phase in the circumferential direction of the piccolo tube 11.

As illustrated in FIGS. 2A and 2B, the first ejection hole line L1 and the second ejection hole line L2 are disposed one above the other, and are formed from the upstream tube 12 to the downstream tube 14. As illustrated in FIG. 2C, in the upstream tube 12, the first ejection hole line L1 disposed on relatively upper side and the second ejection hole line L2 disposed on relatively lower side are so provided as to form a center angle $\theta 12$ ($\theta a$). Likewise, in the middle-stream tube 13 and the downstream tube 14, the first ejection hole line L1 and the second ejection hole line L2 are so provided as to form a center angle $\theta 13$ ($\theta b$) and a center angle $\theta 14$ ($\theta c$), respectively. This allows the piccolo tube 11 to generate a line of blown points of the bleed air by the first ejection hole line L1 and a line of blown points of the bleed air by the second ejection hole line L2. The bleed air ejected from the first ejection hole line L1 is ejected toward an outside airflow stagnation point P1 at an upper limit position (hereinafter, simply referred to as a stagnation point) described later, and the bleed air ejected from the second ejection hole line L2 is ejected toward an outside airflow stagnation point P2 at a lower limit position (hereinafter, simply referred to as a stagnation point) described later.

In this case, in the piccolo tube 11, the center angle between the first ejection hole line L1 and the second ejection hole line L2 that is formed from the upstream tube 12 to the downstream tube 14 is decreased in order of $\theta 12$, $\theta 13$, and $\theta 14$. This is to adjust the distance to the corresponding inner surface 6 of the slat 3. As illustrated in FIG. 2A, the center angle is made small as the distance to the inner surface 6 is large, whereas the center angle is made large as the distance to the inner surface 6 is small, which allows for alignment of the positions of the inner surface 6 to which the bleed air reaches.

The above-described relationship, however, is a mere example, and the present invention is not limited to the positional relationship.

The plurality of ejection holes 16 according to the present embodiment are provided in two lines, the first ejection hole line L1 and the second ejection hole line L2, and the respective positions thereof are specified from the relationship with the stagnation point in the leading edge 5 of the slat 3 as well. This is described below with reference to FIGS. 3A to 3C, and FIGS. 6A and 6B.

Figure 6A:
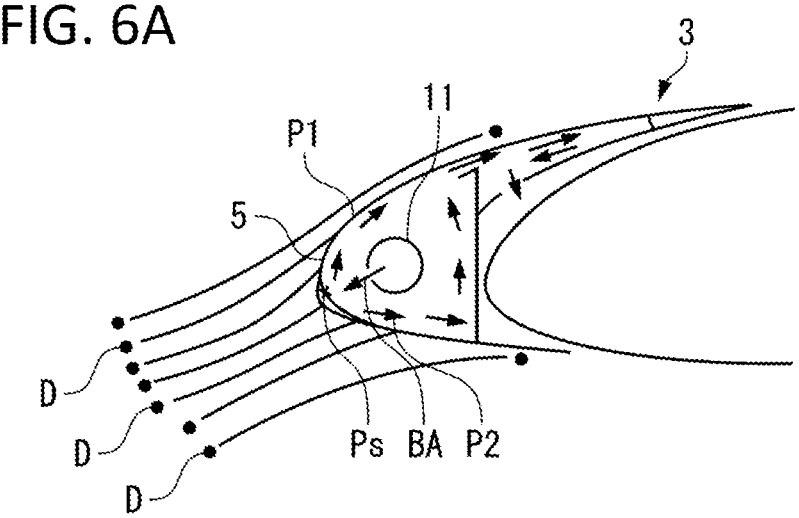
FIG. 6A is a diagram illustrating a state in which droplets collide with a main wing of an aircraft.

When the aircraft flies and droplets D collide with the leading edge 5 of the slat 3 as illustrated in FIG. 6A, a collision amount of the droplets becomes the highest at a point at which the speed becomes zero in a flow field of the droplets D, namely, at the stagnation point Ps. The collision amount of the droplets D is decreased with the increase of the distance from the stagnation point Ps. Further, the droplets do not collide with the leading edge 5 at a position outside of a collision upper limit and a collision lower limit that are distanced from the stagnation point Ps by a specified length. In this way, the amount of the droplets D colliding with the slat 3 is determined based on the stagnation point. Note that the stagnation point Ps is virtually formed, and is determined based on a cross-sectional surface and the position of the slat 3 and an angle of attack of the aircraft.

Figure 6B:
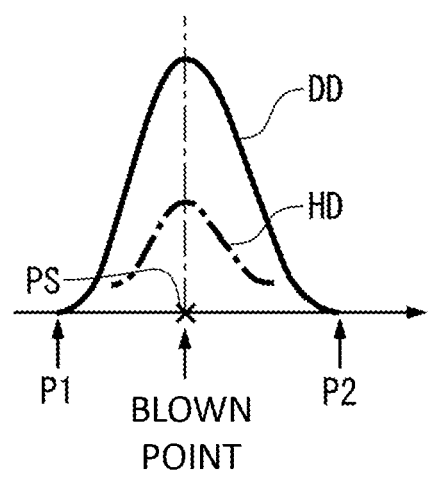
FIG. 6B is a diagram illustrating heat transfer coefficient distribution and droplet collision amount distribution in a case where a blown point of bleed air and a stagnation point are coincident with each other in a piccolo tube that includes ejection holes arranged in one line.
Figure 6C:
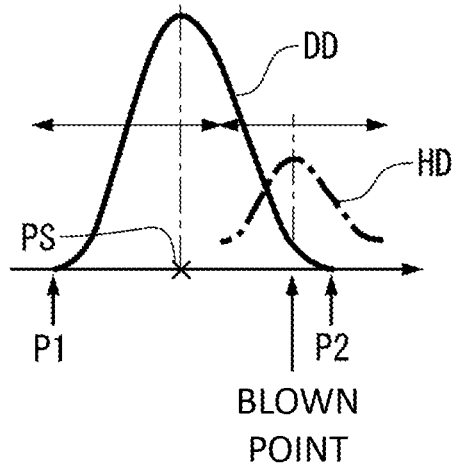
FIG. 6C is a diagram illustrating the heat transfer coefficient distribution and the droplet collision amount distribution after the stagnation point is moved from the point of FIG. 6B.

In other words, it is premised in FIGS. 6A and 6B that the aircraft is flying horizontally as an example; however, the position of the stagnation point Ps is changed as the attitude of the aircraft is changed (the angle of attack is varied). Since the aircraft flies within a specific range of the angle of attack, the stagnation point Ps is also displaced within a specific range. The stagnation point Ps is displaced within a range between a stagnation point P1 and a stagnation point P2. The stagnation point P1 is the uppermost position of occurrence, namely, the upper limit position. The stagnation point P2 is the lowermost position of occurrence, namely, the lower limit position. The stagnation point P1 and the stagnation point P2 are illustrated in FIGS. 3A to 3C.

Figure 3A:
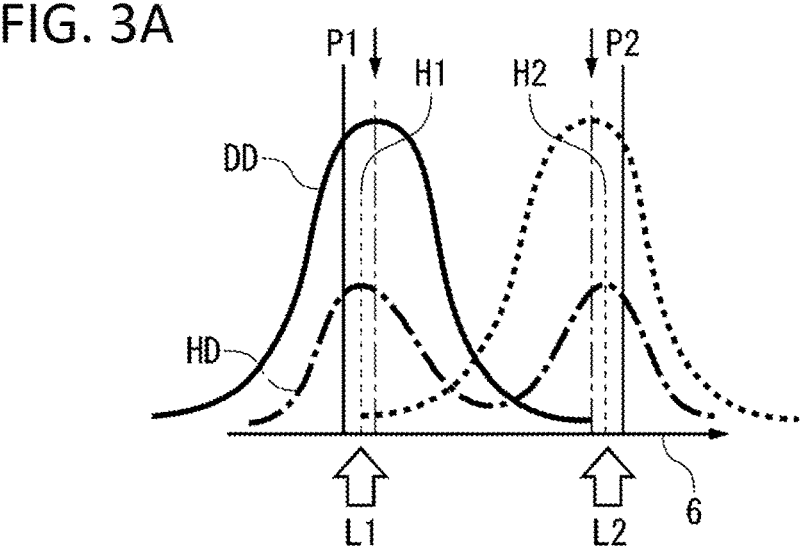
FIGS. 3A to 3C are diagrams each illustrating relationship between heat transfer coefficient distribution of bleed air and droplet collision amount distribution in the anti-icing system of FIGS. 1A and 1B, where

FIG. 3A is a diagram illustrating a state in which the stagnation point Ps is close to the stagnation point P1 as the upper limit position. FIG. 3B is a diagram illustrating a state in which the stagnation point Ps is located in the middle between the stagnation point P1 and the stagnation point P2. FIG. 3C is a diagram illustrating a state in which the stagnation point Ps is close to the stagnation point P2 as the lower limit position. The range between the stagnation point P1 and the stagnation point P2 is referred to as a stagnation point displacement range.

Figure 3B:
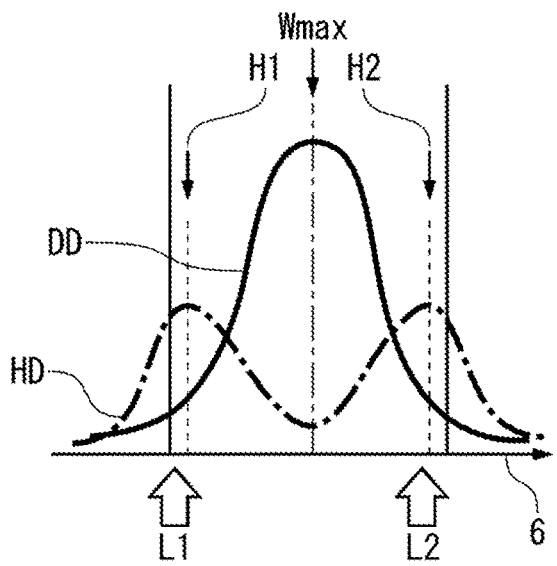
Figure 3C:
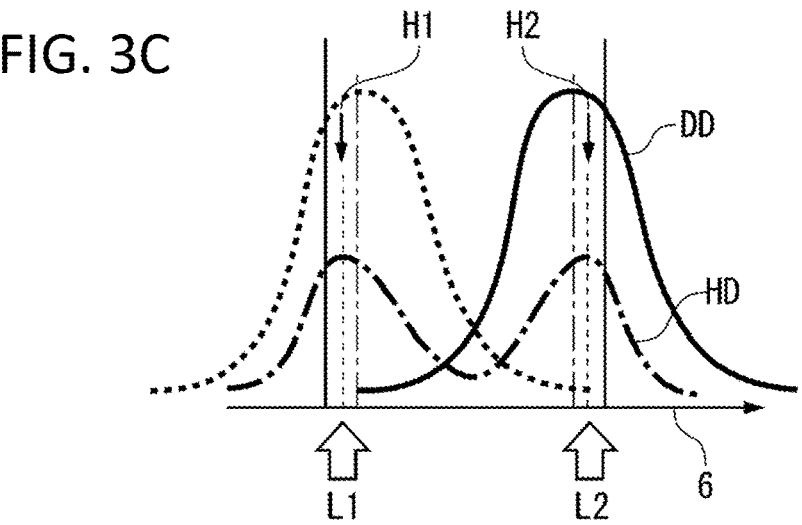

In the present embodiment, as illustrated in FIGS. 3A to 3C, the first ejection hole line L1 is disposed in the stagnation point displacement range inner than the upper limit stagnation point P1, and the second ejection hole line L2 is disposed in the stagnation point displacement range inner than the lower limit stagnation point P2.

The distribution of the heat transfer coefficient by the bleed air ejected from the first ejection hole line L1 and the second ejection hole line L2 has two peaks H1 and H2 as illustrated in FIGS. 3A to 3C. A position at which the heat transfer coefficient reaches the peak H1 is located inside of the stagnation point P1 by a slight distance, and a position at which the heat transfer coefficient reaches the peak H2 is located inside of the stagnation point P2 by a slight distance.

[Effects]

In the anti-icing system 10 according to the present invention, the positional relationship between the first ejection hole line L1 and the stagnation point P1 and the positional relationship between the second ejection hole line L2 and the stagnation point P2, namely, the positional relationship between the peak H1 and the stagnation point P1 and the positional relationship between the peak H2 and the stagnation point P2 each have the above-described relationship. Therefore, even if the stagnation point Ps reaches the stagnation point P1 as the upper limit position, due to change of the attitude of the aircraft, the stagnation point P1 is coincident with or near the position at which the heat transfer coefficient reaches the peak H1 as illustrated in FIG. 3A. Likewise, even if the stagnation point Ps reaches the stagnation point P2 as the lower limit position, due to change of the attitude of the aircraft, the stagnation point P2 is coincident with or near the position at which the heat transfer coefficient reaches the peak H2 as illustrated in FIG. 3C. Therefore, according to the present embodiment, when the flight condition is changed (the angle of attack is varied), the position of the stagnation point is also changed. Thus, the position at which the collision amount of the droplets reaches a peak is also moved but is constantly located near one of the upper blown point or the lower blown point. This allows for efficient evaporation of moisture in a region where the heat transfer coefficient is high, near the blown point, which makes it possible to reduce the amount of the bleed air necessary for anti-icing and to prevent overheating.

Next, as illustrated in FIG. 3B, a case is assumed in which the stagnation point Ps, namely, the position at which the collision amount of the droplets becomes the highest is located in the middle between the positions at which the heat transfer coefficient reaches the respective peaks H1 and H2, namely, at a position at which the heat transfer coefficient distribution reaches a trough.

Figure 4:
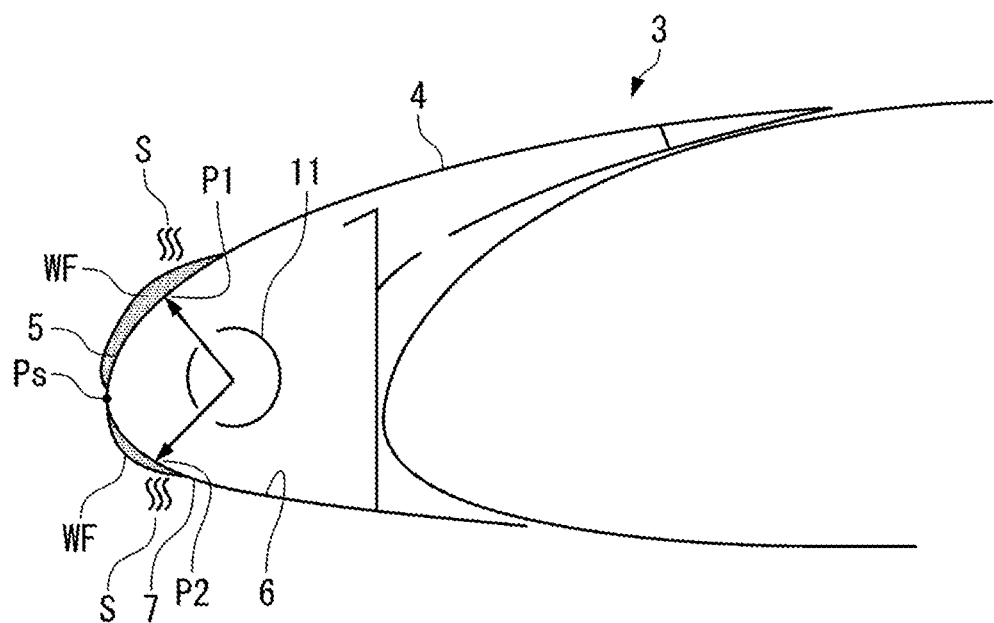
FIG. 4 is a diagram to explain anti-icing action when the stagnation point is located at the position of FIG. 3B.

Overheating easily occurs because a more amount of the bleed air is necessary under the condition that the collision amount of the droplets becomes the highest. When the position (the stagnation point) at which the collision amount of the droplets reaches a peak is set to the position at which the heat transfer coefficient reaches the trough, however, a most amount of the droplets collides with a region where the heating amount is small and the droplets are not wholly evaporated, as illustrated in FIG. 4. Therefore, the residual moisture forms a water film WF on the surface of the leading edge 5 of the slat 3. The water film WF moves downward to reach the positions at which the heat transfer coefficient distribution reaches the respective peaks H1 and H2. Therefore, the water film WF is evaporated (S) to prevent overheating caused by the peaks H1 and H2.

Further, in the anti-icing system 10, it is sufficient to arrange the plurality of ejection holes 16 in the two lines on the piccolo tube 11, and to specify the arrangement position of the ejection holes 16 from the relationship with the stagnation point Ps. Therefore, it is possible to realize uniform heating without using a complicated internal structure as with the structure used in Japanese Patent Laid-Open No. 2011-183922. This results in reduction in the weight of the system. Further, the internal structure is simple and it is possible for the anti-icing system 10 to prevent heat loss of heating of the double wall adopted in Japanese Patent Laid-Open No. 2011-183922, which makes it possible to reduce the supply amount of the bleed air and to improve fuel consumption of the engine. Furthermore, unlike the National Publication of International Patent Application No. 2009-523637, it is unnecessary for the anti-icing system 10 to include a projection on an outer surface, which eliminates the increase of air resistance and the deterioration of the fuel consumption.

Hereinbefore, although the present invention has been described based on the preferred embodiment, the configurations described in the above-described embodiment may be selected or appropriately modified without departing from the scope of the present invention.

Figure 5A:
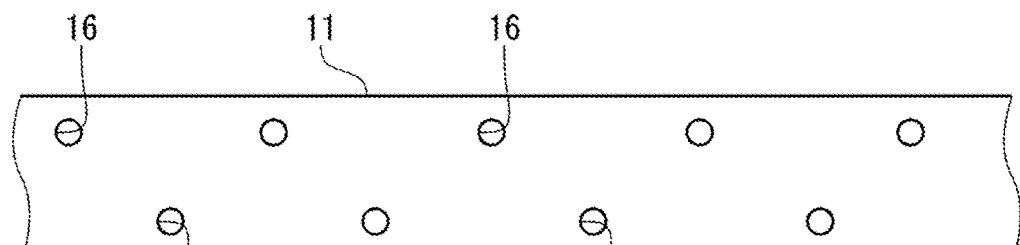
FIGS. 5A to 5D are diagrams each illustrating modifications of the piccolo tube of FIGS. 1A and 1B, where
Figure 5B:
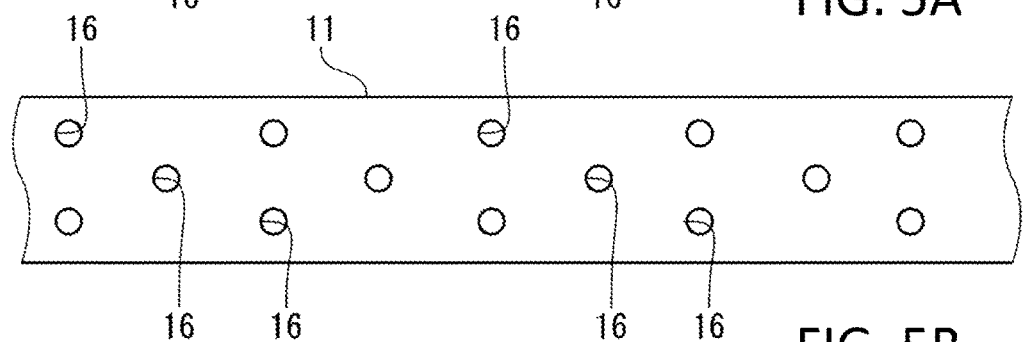

For example, the ejection holes 16 are disposed in the same phase in the circumferential direction of the piccolo tube 11 in the above-described embodiment; however, the present invention is not limited thereto. For example, as illustrated in FIG. 5A, the plurality of ejection holes 16 may be arranged in a staggered arrangement. Arranging the ejection holes 16 in the staggered arrangement makes it possible to suppress unevenness of heating. The ejection holes 16 may be arranged in three lines as illustrated in FIG. 5B, in order to suppress unevenness of heating.

Figure 5C:
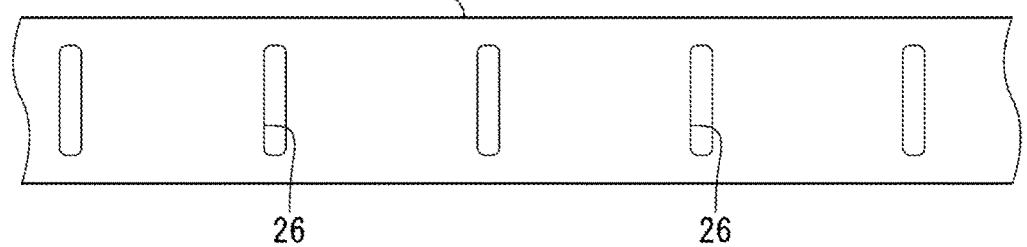

Further, higher heat transfer coefficient is applied to the stagnation point P1 and the stagnation point P2 by arranging, in the two lines, the ejection holes 16 each having a circular opening in the above-described embodiment; however, the present invention is not limited thereto. For example, as illustrated in FIG. 5C, ejection holes 26 each having an opening that extends along the circumferential direction may be provided. Each of the ejection holes 26 is formed of a slit that vertically extends from an upper end opening part to a lower end opening part. The bleed air ejected from the upper end opening part is ejected toward the stagnation point P1 as the upper limit position, and the bleed air ejected from the lower end opening part is ejected toward the stagnation point P2 as the lower limit position. The heat transfer coefficient in the circumferential direction by the bleed air ejected from the ejection holes 26 does not have a peak as with the peaks H1 and H2 in its distribution but may apply a predetermined heat transfer coefficient to the stagnation point P1 and the stagnation point P2.

Figure 5D:
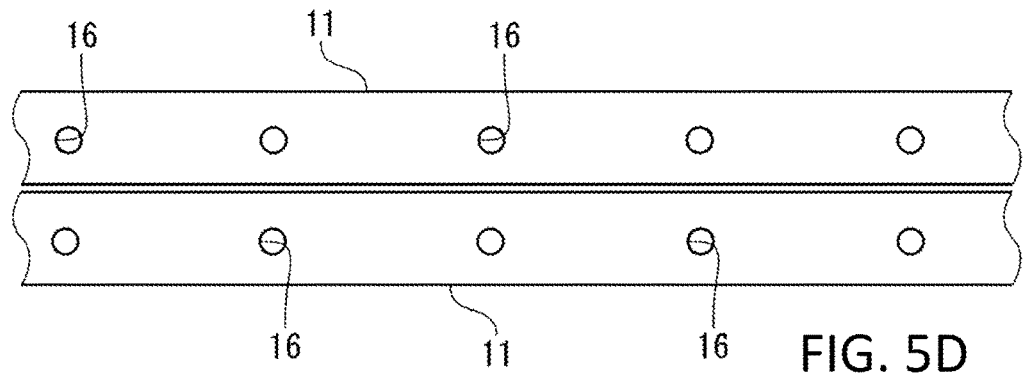

Moreover, although the ejection holes 16 are provided in the two lines in one piccolo tube 11 in the above-described embodiment, the present invention is not limited thereto. For example, as illustrated in FIG. 5D, two piccolo tube 11 each having the ejection holes 16 arranged in one line may be disposed.

What is claimed is:

1. A method of preventing icing on a leading edge of a wing of an aircraft comprising steps of:
supplying heated air to a rear end of a piccolo tube in a longitudinal direction thereof;
ejecting a first portion of the supplied heated air from the piccolo tube through a first plurality of ejection holes toward an upper limit position corresponding to an upper maximum position of an outside airflow stagnation point of the wing, wherein the outside airflow stagnation point is virtually determined based on a cross-sectional surface of the wing and a calculated angle of attack of the aircraft and virtually formed on the wing;
heating the upper limit position to a temperature sufficient to evaporate fluid on a corresponding outer surface of the wing;
ejecting a second portion of the supplied heated air from the piccolo tube through a second plurality of ejection holes toward a lower limit position corresponding to a lower maximum position of the outside air flow stagnation point of the wing; and
heating the lower limit position to a temperature sufficient to evaporate fluid on a corresponding outer surface of the wing, wherein
the first plurality of ejection holes of the piccolo tube are straightly arranged in a first ejection hole line L1 and the second plurality of ejection holes are straightly arranged in a second ejection hole line L2, the first ejection hole line L1 being disposed on relatively upper side, and the second ejection hole line L2 being disposed on lower side of the first ejection hole line L1,
the piccolo tube has a tapered shape from the rear end to a front end, and
the first ejection hole line L1 and the second ejection hole line L2 form, on the front end, a center angle θc smaller than a center angle θa that is formed by the first ejection hole line L1 and the second ejection hole line L2 on the rear end.

2. The method according to claim 1, wherein the outside airflow stagnation point under a condition that a collision amount of droplets becomes highest is disposed in a middle between the first ejection hole line L1 and the second ejection hole line L2.

3. The method according to claim 1, wherein the plurality of first ejection holes forming the first ejection hole line L1 and the plurality of second ejection holes forming the second ejection hole line L2 are arranged in a staggered arrangement.

4. The method according to claim 1, wherein
each of the first and second ejection holes of the piccolo tube is formed of a slit that vertically extends from an upper end opening part to a lower end opening part,
the heated air ejected from the upper end opening part is ejected toward the upper limit position, and
the heated air ejected from the lower end opening part is ejected toward the lower limit position.

5. The method according to claim 1, wherein the first and second plurality of ejection holes are disposed such that the outside airflow stagnation point under a condition that a collision amount of droplets becomes highest is located in a middle between positions at which heat transfer coefficient by the heated air ejected from the first ejection hole line L1 and the second ejection hole line L2 reaches respective peaks.

6. The method according to claim 1, wherein the plurality of first ejection holes forming the first ejection hole line L1 and the plurality of second ejection holes forming the second ejection hole line L2 are disposed in the same phase in a circumferential direction of the piccolo tube.

7. The method according to claim 1, wherein:
jet flows of the heated air ejected from the plurality of first ejection holes of the first ejection hole line L1 generate, in operation, a first line of blown points on an inner surface of the leading edge corresponding to the upper limit position of the outside airflow stagnation point on an upper side of the leading edge;
jet flows of the heated air ejected from the plurality of second ejection holes of the second ejection hole line L2 generate, in operation, a second line of blown points on the inner surface of the leading edge corresponding to the lower limit position of the outside airflow stagnation point on a lower side of the leading edge; and
the inner surface of the foremost part is located between the first line of blow points and the second line of blown points.

8. An aircraft comprising the anti-icing system operating according to the method of claim 1.

9. The aircraft according to claim 8, wherein the anti-icing system is provided in a main wing.

10. An anti-icing system that blows heated air to a curved inner surface of a leading edge of a wing of an aircraft, the aircraft having a longitudinal axis in a direction of travel, the anti-icing system comprising:
a piccolo tube that includes a flow path through which the heated air flows in a longitudinal direction from a rear end to a front end, and a first plurality of ejection holes and a second plurality of ejection holes provided along the longitudinal direction to make the flow path communicate with an outside; and
a supply source that supplies the heated air toward the piccolo tube, wherein
the piccolo tube comprises a plurality of tubes each having a different inner diameter, wherein the inner diameter of the tube corresponding to the front end of the piccolo tube is smaller than the inner diameter of the tube corresponding to the rear end of the piccolo tube,
the first plurality of ejection holes of the piccolo tube are straightly arranged in a first ejection hole line L1 and the second plurality of ejection holes are straightly arranged in a second ejection hole line L2, the first ejection hole line L1 being disposed on relatively upper side, and the second ejection hole line L2 being disposed on lower side of the first ejection hole line L1,
the first ejection hole line L1 and the second ejection hole line L2 form, on the front end, a center angle θc smaller than a center angle θa that is formed by the first ejection hole line L1 and the second ejection hole line L2 on the rear end, and
the heated air ejected from the first plurality ejection holes of the piccolo tube is ejected toward an upper limit position and the heated air ejected from the second plurality of ejection holes of the piccolo tube is ejected toward a lower limit position of an outside airflow stagnation point that are virtually formed on the wing, wherein the outside airflow stagnation point is virtually determined based on a cross-sectional surface of the wing and a calculated angle of attack of the aircraft and virtually formed on the wing, wherein the heated air from the first plurality of ejection holes and the second plurality of ejection holes is not ejected toward the inner surface of a foremost part of the leading edge of the wing, wherein the foremost part of the leading edge is a forward-most part of the leading edge in a longitudinal direction of the wing that aligns with the longitudinal axis of the aircraft.

11. An anti-icing system that blows heated air to a curved inner surface of a leading edge of a wing of an aircraft, the aircraft having a longitudinal axis in a direction of travel, the anti-icing system comprising:
- a piccolo tube that includes a flow path through which the heated air flows in a longitudinal direction from a rear end to a front end, and a first plurality of ejection holes and a second plurality of ejection holes provided along the longitudinal direction to make the flow path communicate with an outside; and
- a supply source that supplies the heated air toward the piccolo tube, wherein
- the rear end of the piccolo tube is closer to the leading edge of the wing than the front end of the piccolo tube,
- the first plurality of ejection holes of the piccolo tube are straightly arranged in a first ejection hole line L1 and the second plurality of ejection holes are straightly arranged in a second ejection hole line L2, the first ejection hole line L1 being disposed on relatively upper side, and the second ejection hole line L2 being disposed on lower side of the first ejection hole line L1,
- the first ejection hole line L1 and the second ejection hole line L2 form, on the front end, a center angle $\theta c$ smaller than a center angle $\theta a$ that is formed by the first ejection hole line L1 and the second ejection hole line L2 on the rear end, and
- the heated air ejected from the first plurality of ejection holes of the piccolo tube is ejected toward an upper limit position and the heated air ejected from the second plurality of ejection holes of the piccolo tube is ejected toward a lower limit position of an outside airflow stagnation point that are virtually formed on the wing, wherein the outside airflow stagnation point is virtually determined based on a cross-sectional surface of the wing and a calculated angle of attack of the aircraft and virtually formed on the wing, wherein the heated air from the first plurality of ejection holes and the second plurality of ejection holes is not ejected toward the inner surface of a foremost part of the leading edge of the wing, wherein the foremost part of the leading edge is a forward-most part of the leading edge in a longitudinal direction of the wing that aligns with the longitudinal axis of the aircraft.

12. The anti-icing system of claim 11, wherein the piccolo tube has a tapered shape from the rear end to the front end.

* * * * *